United States Patent Office 3,423,510
Patented Jan. 21, 1969

3,423,510
3-(p-HALOPHENYL) - 3 - (2′-PYRIDYL-N-METHYL-PROPYLAMINE FOR THE TREATMENT OF DEPRESSION
Ernest B. Sigg, Briarcliff Manor, N.Y., assignor to Geigy Chemical Corporation, Ardsley, N.Y., a corporation of Delaware
No Drawing. Filed Aug. 31, 1966, Ser. No. 576,235
U.S. Cl. 424—263   5 Claims
Int. Cl. A61k 27/00

ABSTRACT OF THE DISCLOSURE

An anti-depressant effect is obtained by administration of compositions containing a 3-(p-halophenyl)-3-(2′-pyridyl-N-methylpropylamine such as 3-(p-chlorophenyl)-3-(2′-pyridyl)-N-methylpropylamine.

DETAILED DESCRIPTION

This invention relates to a method for treating depression and to compositions useful for this purpose. More specifically the present invention pertains to a method for treating depression in a host by administering to said host an effective amount of certain derivatives of 3-(phenyl)-3-(2′-pyridyl)-N-methylpropylamine, or of a non-toxic pharmaceutically acceptable acid addition salt thereof.

The method described employs halogen derivatives of 3 - (phenyl)-3-(2′-pyridyl)-N-methylpropylamine which can be represented by the formula

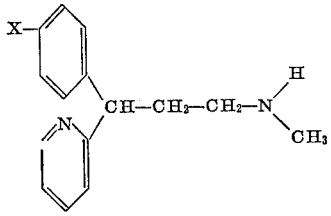

wherein X is halogen, especially chlorine or bromine or the non-toxic pharmaceutically acceptable acid addition salts thereof.

Representative compounds within the scope of the above formula which are useful for treating depression in a host are particularly the following:

3-(p-chlorophenyl)-3-(2′-pyridyl)-N-methylpropylamine,
3-(p-bromophenyl)-3-(2′-pyridyl)-N-methylpropylamine, and the maleates thereof.

One of the modes of producing the compounds defined by the above formula comprises:

(a) Reacting a tertiary amine of the formula

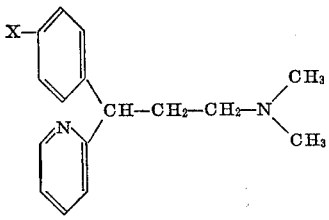

wherein X has the meaning given above, with a carbonic acid halide which is a compound in which the one hydroxyl group of the carbonic acid molecule is replaced by either chlorine or bromine and the other hydroxyl group of the carbonic acid molecule is replaced by lower alkyl, especially methyl, lower alkoxy, benzyloxy, phenyl or chlorine, and of which there are preferred chloroformic acid esters, especially the lower alkyl esters such as chloroformic acid methyl ester, ethyl ester or the benzyl ester, furthermore phosgene, a lower alkanoic acid halide such as acetic chloride or bromide, or benzoyl chloride, in the presence or absence of a suitable inert organic solvent such as, preferably, benzene, toluene, carbon tetrachloride, but also diethyl ether, diisopropyl ether or tetrahydrofuran, at room temperature (+20° C.) or at elevated temperature, up to about 110° C., preferably in the range of 40° to 110° C. The acid halides can be employed in equimolar amount or in a considerable excess and may serve in the latter case, as sole reaction medium. The reaction is exothermic and the methyl group is split off in form of methylhalide. If needed, the reaction can be performed or completed with heating.

(b) Hydrolyzing the resulting compound of the formula

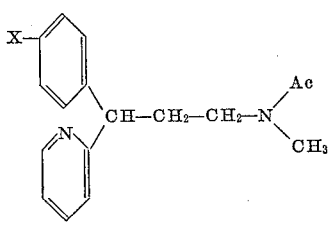

wherein:

Ac represents lower alkanoyl, especially acetyl, lower alkoxycarbonyl, benzyloxycarbonyl, chlorocarbonyl, or benzoyl, in particular the radicals CH₃OCO—, $C_2H_5OCO-$ $C_6H_5-CH_2-OCO-$ and ClCO—, and X has the meaning given above;

hydrolysis being carried out at an elevated temperature ranging up to 230°, either in higher boiling organic solvents containing hydroxyl groups such as, e.g. ethylene glycol, diethylene glycol or the mono-lower alkyl ethers thereof, or in lower alkanols; in the latter case, the treatment may be performed in a closed vessel.

The reaction mixture obtained from hydrolysis step (b) is then processed in a conventional manner to recover the basic constituent, for instance by evaporation of the solvent and/or dilution with water, extraction of the residue or aqueous solution with water-immiscible extractants such as chloroform, ether, benzene and the like and recovering the desired product.

The term "hydrolysis" as employed here embraces alkaline as well as acid hydrolysis followed by spontaneous decarboxylation to yield the desired compounds.

The term "lower" used in this specification in connection with alkyl means maximally 6, preferably 1 to 3 carbon atoms; in connection with alkoxy and alkanoyl it means maximally 4 carbon atoms.

The starting materials are known and disclosed in U.S. Pats. 2,567,245 and 2,676,964.

This invention is based on the discovery that the herein described compounds, besides being potent antihistaminics, unexpectedly can be used to produce an antidepressant effect in a host suffering from depression without showing any neuroleptic effect. Accordingly they may find use for the treatment of mental disorders like agitated or anxious depression, endogenous depression, manic depressive disease, reactive depression, senile depression as well as depressions associated with other psychiatric disorders.

In contrast thereto the closely related 3-(p-chlorophenyl)-3-(2′-pyridyl)-N,N-dimethylpropyl-amine only shows antihistaminic activity together with an undesirable sedative effect which usually is associated with the use of most antihistaminics. It now has been demonstrated that the activity of the compounds of the invention is truly thymoleptic (antidepressant), not stimulating or due to any monoamine oxidase inhibition and that their antidepressant activity is specific and devoid of any neuroleptic effect.

It is known that reserpine prolongs the transient increase of diphosphopyridine nucleotide (hereinafter referred to as NAD) in rat liver which follows the administration of nicotinamide. Antidepressant agents such as imipramine [5-(γ-dimethylaminopropyl) - 10,11-dihydro-5H-dibenz[b,f]-azepine] and iproniazid [1-isonicotinoyl-2-isopropyl-hydrazine] can prevent this biochemical response to reserpine. The compounds of the invention surprisingly also prevent this biochemical response to reserpine. Their antidepressant activity has been demonstrated by the following methods and results:

(1) 3-(p-chlorophenyl)-3-(2' - pyridyl)-N-methylpropylamine maleate was injected into rats 18 hours prior to treatment with reserpine, and nicotinamide is injected two hours after the reserpine. The animals were killed 24 hours after nicotinamide injection and the liver was analyzed for NAD. In three experiments the above compound (56 mg./kg.) was 72, 89 and 100 percent (average 84%) effective in preventing the response to reserpine.

(2) Antidepressant agents have also been shown to reverse the sedation in rats induced by the reserpine-like tranquilizer, 2-ethyl-1,3,4,6,7,11b - hexahydro-3-isobutyl-9,10-dimethoxy-2H-benzo(a)quinolizin-2-ol.

3-(p-Chlorophenyl)-3-(2'-pyridyl) - N - methylpropylamine maleate, 56 mg./kg., a dose equivalent to an effective dose of imipramine reversed the sedative effect of said tranquilizer.

(3) Some antidepressant agents active in both of above tests may also be monoamine oxidase (hereinafter referred to as MAO) inhibitors. It now has been indicated that the antidepressant action of the compounds of the invention may be similar to imipramine and not to iproniazid, a monoamine oxidase inhibitor:

3-(p-chlorophenyl)-3-(2'-pyridyl) - N - methylpropylamine maleate, 56 mg./kg., was injected into rats and the liver was assayed for MAO activity 3 hours following drug administration. The above compound did not inhibit the rat liver enzyme, MAO. Iproniazid, 50 mg./kg., caused 100 percent inhibition of the rat liver enzyme under these conditions.

(4) Other evidence of the antidepressant activity of the compounds of the invention is their true potentiation of β-(3,4-dihydroxyphenyl)-L-alanine (hereinafter referred to as DOPA).

It is a prevailing opinion that the thymoleptic (antidepressant) effect of imipramine is achieved by a facilitation of adrenergic (norepinephrine mediated) synaptic transmission in the central nervous system [Sigg, Canad. Psychiat. Assoc. J., 4:575–585 (1959)]. DOPA is a metabolic precursor of norepinephrine. Predosing with DOPA therefore allows for the accumulation of excess stores of norepinephrine in the central nervous system. A monoamine oxidase inhibitor pargyline, amplifies the effects of released norepinephrine by preventing its destruction. In mice the result of this is an enhancement of spontaneous motor activity as measured in the activity cage. Imipramine, which is not a monoamine oxidase inhibitor and does not cause an increase in motor activity by itself, potentiates the effects of DOPA in this respect.

Male mice ($CF_1$) were injected intraperitoneally with—

(a) 200 mg./kg. of pargyline
(b) 200 mg./kg. of pargyline and test drug
(c) 50 mg./kg. of DOPA and 200 mg./kg. of pargyline
(d) 50 mg./kg. of DOPA, 200 mg./kg. of pargyline and the test drug.

All injections were made in a volume of 0.1 ml./10 g. and 2 hours prior to the session in the mouse activity cages. Activity was monitored for the next 3 hours and the data recorded as total activity for this three hour period.

The following table summarizes the results of the comparison of 3-(p-chlorophenyl)-3-(2'-pyridyl)-N-methylpropylamine maleate the dimethyl analog thereof and imipramine with mean activity counts expressed relative to control (pargyline alone), set at unity:

| Test Drug | Dose, mg./kg., I.P. | A Pargyline Alone | B Paragyline+ Test Drug | C Pargyline+ DOPA | D Pargyline+ DOPA+ Test Drug |
|---|---|---|---|---|---|
| 3-(p-chlorophenyl)-3-(2'-pyridyl)-N-methylpropylamine maleate | 2.5 | 1 | 1.18 | 1.96 | 7.45 |
| Dimethyl analog thereof | 2.5 | 1 | 12.49 | 1.23 | 16.89 |
|  | 10.0 | 1 | 16.17 | 1.28 | 9.73 |
| Imipramine | 10.0 | 1 | 3.01 | 1.53 | 4.88 |

When combined with pargyline and DOPA (column D), all three agents caused increases in activity as compared with "Pargyline Alone" (A) and "Pargyline+DOPA" (C). However, 3-(p-chlorophenyl)-3-(2'-pyridyl)-N,N-dimethylpropylamine maleate caused substantial increases in activity when no DOPA was administered (B vs. A). 3-(p-chlorophenyl)-3-(2'-pyridyl)-N-methylpropylamine maleate and imipramine, on the other hand, had little or no influence on activity when no DOPA was administered. These results indicate that while 3-(p-chlorophenyl)-3-(2' - pyridyl) - N - methylpropylamine maleate and imipramine are true DOPA (and subsequently, norepinephrine) potentiators, the effects of 3-(p-chlorophenyl)-3-(2'-pyridyl) - N,N - dimethylpropylamine maleate and DOPA are simply additive.

(5) A test for neuroleptic (strong tranquilizer) activity is the specific inhibition of shock avoidance behavior. Gerbils (*Meriones unguiculatus*) are trained to depress a lever to avoid electrical shocks. When shocks are delivered, they are terminated by a lever depression. Meaningful measures are an increase in the number of shocks delivered (inhibition of avoidance behavior by reduction of "anxiety") and an increase in the average time taken to turn off delivered shocks (shock escape latency), which indicates a nonspecific impairment of the gerbil's ability to make a lever pressing response.

Comparative results for 3-(p-chlorophenyl)-3-(2'-pyridyl)-N-methylpropylamine maleate and imipramine are shown in the following table. Three gerbils were tested at each dose of 3-(p-chlorophenyl)-3-(2'-pyridyl)-N-methylpropylamine maleate and four gerbils at each dose of imipramine:

| Test Drug | Dose, mg./kg., I.P. | Shocks Delivered | Mean Escape Latency (sec.) |
|---|---|---|---|
| 3-(p-chlorophenyl)- 3-(2'-pyridyl)-N- Methylpropylamine Maleate | Control | 1.9 | 0.53 |
|  | 10 | 4.0 | 1.03 |
|  | 20 | 5.7 | 0.72 |
|  | 10 | 4.7 | 1.17 |
| Imipramine | Control | .0.6 | 0.96 |
|  | 20 | 19.5 | 0.66 |
|  | 40 | 14.2 | 0.78 |

Imipramine caused a progressive increase in the number of shocks delivered with no change in mean escape latency (a weak neuroleptic pattern). With 3-(p-chlorophenyl)-3-(2'-pyridyl) - N - methylpropylamine maleate, however, no changes in the mean number of shocks delivered or in mean escape latency were observed. The apparent antidepressant effect of 3-(p-chlorophenyl)-3-(2'-pyridyl)-N-methylpropylamine maleate is therefore considered relatively specific as compared with imipramine.

The antihistaminic effect of the herein described compounds has been demonstrated in guinea pigs which were exposed to a histamine aerosol. All untreated guinea pigs died after an exposure time of less than 3 minutes. Of guinea pigs treated with 2 mg./kg. of 3-(p-chlorophenyl)-3-(2'-pyridyl)-N-methylpropylamine maleate, 60% survived and at 20 mg./kg. 100% survived.

The present invention comprehends not only the above described active compounds in their free base form but it also includes non-toxic pharmaceutically acceptable acid addition salts thereof, most of which are water soluble, which may be formed from said compounds in accordance with conventional practice, by using appropriate inorganic and organic acids, such as hydrochloric acid, hydrobromic acid, sulfuric acid, phosphoric acid, methane sulfonic acid, ethane disulfonic acid, β-hydroxyethane sulfonic acid, acetic acid, succinic acid, fumaric acid, maleic acid, malic acid, tartaric acid, citric acid, benzoic acid, salicylic acid and mandelic acid.

The compounds of the invention can be administered by any of the conventional means available for use in conjunction with pharmaceuticals. They preferably are used in the form of a composition comprising one of the above active compounds, or a non-toxic pharmaceutically acceptable acid addition salt thereof, admixed with pharmaceutically acceptable organic and/or inorganic solid or liquid carriers suitable for enteral or parenteral administration. They are used, for instance, in the form of tablets or suppositories or in liquid form as solutions and syrups. Such preparations and compositions contain at least 0.05% of active compound.

Its percentage in these preparations and compositions, of course, may be varied and may be between about 0.1% and about 50% or even higher of the total weight of a dosage unit. Preferred compositions and preparations are prepared in such a manner that a dosage unit form contains between about 2 mg. and about 100 mg. of active compound. Dosage unit forms e.g. tablets, can be scored for better adaptation of the dosage.

As excipients for solid compositions, substances which do not react with the active compound can be employed such as e.g. gelatine, sugar, dextrose, lactose, starches, stearic acid, magnesium or calcium stearate, methyl cellulose, talcum, cholesterol, silica, polyvinylpyrrolidone or any other known carrier for the preparation of solid medicaments. As excipients for liquid preparations, polyvalent alcohols such as e.g. glycerol, alkylene and polyalkylene glycols such as, e.g. propylene glycol can be used. Water is especially used for the soluble salts of the active compound, for instance for the preparation of injectable solutions. Such injectable solutions may be sterilized and/or contain auxiliary substances such as preserving agents, stabilizing agents, wetting or emulsifying agents, salts for varying the osmotic pressure or buffers. An active compound of the invention can also be incorporated into semi-solid substances as cocoa butter etc. which melt within a suitable range, e.g. 34–36° C., to form suppositories. They may also contain other therapeutically useful substances.

Dosage of the pharmacological preparations of the active compounds according to the invention has to be individualized. The daily doses vary from about 1 mg. to about 40 mg. of active compound. The preparations may also be given intramuscularly, intravenously or subcutaneously.

As is obvious to those skilled in the art the compounds of this invention possess a center of asymmetry and exist in optically active forms and in form of mixtures thereof.

The methods for the preparation of these compounds and compositions thereof with pharmaceutical carriers can be exemplified more fully by the following illustrative example and prescriptions. Parts are given therein as parts by weight. The temperatures are given in degrees centigrade; "abs." means anhydrous:

Example.—3-(p-chlorophenyl)-3-(2'-pyridyl)-N-methylpropylamine maleate

To the solution of 57 g. of 3-(p-chlorophenyl)-3-(2'-pyridyl)-N,N-dimethylpropylamine maleate in 200 ml. of water was added 100 ml. of 50% aqueous sodium hydroxide solution. The free base was extracted twice from this solution with 60 ml. each of benzene and the benzene extracts were dried over potassium hydroxide pellets. The filtered benzene solution was added dropwise within two hours at 55–62° to a stirred solution of 15 ml. of ethylchloroformate in 120 ml. of abs. benzene. The reaction mixture was refluxed for six hours, cooled, washed twice with 100 ml. each of 2 N sodium hydroxide solution, twice with 50 ml. each of saturated aqueous sodium chloride solution and dried over potassium carbonate. After the solvent has been distilled off 31.4 g. crude oily 3-(p-chlorophenyl)-3-(2'-pyridyl) - N - methyl-N-carboethoxy propylamine was obtained.

The crude oil was added to a mixture of 32 g. of potassium hydroxide and 185 ml. of diethyleneglycolmonoethylether and heated in an oil bath up to 225° whereupon 12.5 ml. of a colorless liquid was distilled off. Heating at 225° was maintained for six hours. The reaction mixture was cooled, treated with 800 ml. of water and extracted four times with 100 ml. each of a benzene-ether mixture 1:1. The combined organic layers were washed four times with 50 ml. each of saturated aqueous sodium chloride solution, dried over potassium carbonate and evaporated to give 26.4 g. of a dark brown oil. The oil was distilled, the fraction with the boiling range 140–160°/0.5 mm. collected (16 g.) and transferred into the maleate by dissolving in 50 ml. of ether and adding a solution of 6.7 g. of maleic acid in 10 ml. of abs. ethanol and 180 ml. of ether. The crude 3-(p-chlorophenyl)-3-(2'-pyridyl)-N-methylpropylamine maleate (17 g.) was collected and recrystallized three times from abs. ethanol to give 14.1 g. of colorless prisms which were dried 3 hrs. at 100°/12 mm. and melted at 119–123.5°

*Analysis.*—Calc'd: C, 60.56; H, 5.61; Cl, 9.41; N, 7.43. Found: C, 60.76; H, 5.63; Cl, 9.35; N, 7.20.

If instead of 3-(p-chlorophenyl)-3-(2'-pyridyl)-N,N-dimethylpropylamine maleate as starting material the corresponding bromo compound is used, 3-(p-bromophenyl)-3-(2'-pyridyl)-N-methylpropylamine maleate is obtained.

Prescription I.—Tablets

| Ingredient: | Parts |
|---|---|
| (1) 3 - (p-chlorophenyl) - 3-(2'-pyridyl)-N-methylpropylamine maleate | 8.0 |
| (2) Corn starch | 75.0 |
| (3) Lactose | 110.0 |
| (4) Soluble starch | 5.0 |
| (5) Magnesium stearate | 2.0 |
| Total | 200.0 |

(1), (2) and (3) are thoroughly mixed, the mix is granulated with an aqueous solution of (4), the dried granulate is mixed with (5) and pressed into 200 milligram tablets. Each tablet contains 8 milligrams of the antidepressant (1).

Prescription II.—Syrup

| Ingredient: | | |
|---|---|---|
| 3 - (p-chlorophenyl)-3-(2'-pyridyl)-N-methyl propylamine maleate | g.. | 5.0 |
| p-Hydroxybenzoic acid methylester | g.. | 7.5 |
| Sucrose | g.. | 5000.0 |
| Flavor | | q.s. |
| Dye | | q.s. |
| Aq. dest. q.s. ad 10,000 cc. | | |

The ingredients are dissolved in the water. Each teaspoonful of this syrup contains 2 milligrams of antidepressant compound.

Prescription III.—Injection solution

| | G. |
|---|---|
| 3 - (p - chlorophenyl) - 3 - (2' - pyridyl)-N-methylaminopropyl maleate | 100.0 |
| Chlorobutanol | 3.0 |

Water for injection q.s. ad 1000 cc.

The ingredients are dissolved in the water, sterilized and filled into vials and multiple dose vials.

What is claimed is:

1. A method for treating depression in a host comprising administering to a host suffering from depression an effective amount of a compound of the formula

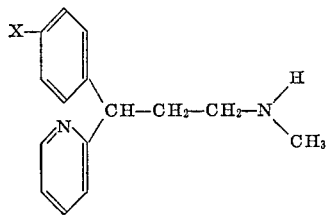

wherein X is chlorine or bromine, or a non-toxic, pharmaceutically acceptable acid addition salt thereof.

2. A method in accordance with claim 1 in which the compound is 3 - (p-chlorophenyl)-3-(2'-pyridyl)-N-methylpropylamine.

3. A method in accordance with claim 1 in which the compound is 3(p-bromophenyl)-3-(2'-pyridyl)-N-methylpropylamine.

4. A method in accordance with claim 1 in which the compound is 3-(p-chlorophenyl)-3-(2'-pyridyl)-N-methylpropylamine maleate.

5. A method in accordance with claim 1 in which the compound is 3-(p-bromophenyl)-3-(2'-pyridyl)-N-methylpropylamine maleate.

References Cited

UNITED STATES PATENTS

| 2,567,245 | 9/1951 | Sperber | 260—296 |
| 2,676,964 | 4/1954 | Sperber | 260—296 |

OTHER REFERENCES

Sunagawa et al.: Jour. of the Pharm. Soc. of Japan, pp. 882–885 (1953).

ALBERT T. MEYERS, *Primary Examiner.*

S. FRIEDMAN, *Assistant Examiner.*

U.S. Cl. X.R.

424—232